United States Patent Office 3,766,196
Patented Oct. 16, 1973

3,766,196
3-(2-PYRIDYL) PYRROLIDINES AND PYRROLINES
William John Welstead, Jr., and Bernard V. Franko, Richmond, Va., assignors to A. H. Robins Company, Incorporated, Richmond, Va.
No Drawing. Filed July 26, 1971, Ser. No. 166,254
Int. Cl. C07d 31/34
U.S. Cl. 260—295 CA         8 Claims

ABSTRACT OF THE DISCLOSURE

Novel 3-(2-pyridyl) derivatives of pyrrolidines and pyrrolines are described having the formula:

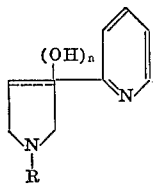

wherein R is hydrogen, lower alkyl, phenyllower-alkyl and lower-alkoxycarbonyl, n is one and zero and when n is zero the dotted line represents a double bond. The 3-pyrrolidinol compounds are prepared by reacting appropriately substituted pyrrolidinones with 2-pyridyllithium and the pyrroline compounds are prepared by dehydrating the 3-pyrrolidinol compounds. The compounds have local anesthetic activity.

The present invention relates to novel pyrrolidine and pyrroline compounds and is more particularly concerned with 1-R-3-(2-pyridyl)-3-pyrrolidinols and 3-pyrrolines, compositions thereof and methods of making and using the same.

The invention is especially concerned with novel compounds having the formula:

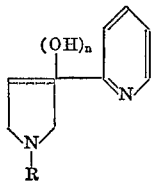

Formula I wherein;

R is hydrogen, lower-alkyl, phenyllower-alkyl and lower-alkoxycarbonyl,
n is one and zero, and when n is zero the dotted line represents a double bond, and
pharmaceutically acceptable acid addition salts.

The novel concept of the present invention resides in the introduction of a hydroxyl radical and a 2-pyridyl radical at the 3 position of a pyrrolidine compound and the subsequent dehydration of the novel 1-R-3-(2-pyridyl)-3-pyrrolidinols thusly prepared to novel 1-R-3-(2-pyridyl)-3-pyrrolines. The compounds possess local anesthetic activity.

The 1-R-3-(2-pyridyl)-3-pyrrolidinols are extremely stable in strong acid and can be dehydrated to the pyrrolines in polyphosphoric acid at elevated temperatures.

The present invention further contemplates the use of the novel compounds in mammals when local anesthesia is desired. Preparations useful for infiltration, nerve block, peridural and caudal anesthesia are usually prepared as sterile solutions of the acid salts of the novel compounds of the present invention, the solutions containing from 0.5% to 5.0% of the active ingredient.

It is, accordingly, an object of the present invention to provide new and useful 1-R-3-(2-pyridyl)-3-pyrrolidinols and 1-R-3-(2-pyridyl)-3-pyrrolines. Another object is to provide 1-R-3-(2-pyridyl)-3-pyrrolidinols useful as local anesthetics and as intermediates for the preparation of novel 1-R-3-(2-pyridyl)-3-pyrrolines. A still further object is to provide methods for preparing the new and useful compounds described herein. Other objects of the invention will be apparent to one skilled in the art, and still other objects will become apparent hereinafter.

In the definition of the symbols in the foregoing Formula I and where they appear elsewhere throughout the specification and claims thereof, the terms used herein have the following significance.

The term "lower-alkyl" used herein includes straight and branched chain radicals of up to eight carbon atoms inclusive and is exemplified by such groups as methyl, ethyl, propyl, isopropyl, butyl, amyl, hexyl, heptyl, octyl and the like.

The term "phenyllower-alkyl" includes groups such as benzyl, phenethyl, methylbenzyl, phenpropyl, and the like.

Lower-alkoxycarbonyl has the formula

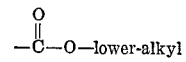

METHODS OF PREPARATION

The preparation of the novel 1-R-3-(2-pyridyl)-3-pyrrolidinols I and 1-R-3-(2-pyridyl)-3-pyrrolines I is accomplished by reacting a 1-R-3-pyrrolidinone II with 2-lithiopyridine III and dehydration of the 1-R-3-(2-pyridyl)-3-pyrrolidinol. The reaction sequence is illustrated by the following:

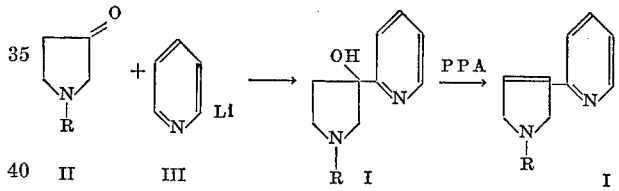

wherein R has the values given hereinabove. A suitable general method of preparing compounds of Formula I is as follows:

An ethereal solution of n-butyl lithium is prepared at −10° C. by the addition of n-butylbromide to a stirred suspension of lithium wire in ether. The stirred solution is cooled to −40° C. to −60° C. and an ether solution of 2-bromopyridine is added. After the 2-lithio pyridine compound is formed, the stirred solution is treated with an ethereal solution of the selected 1-R-3-pyrrolidinone. Subsequent to the reaction which is run at −40° C. to −60° C. the reaction mixture is allowed to warm to approximately 5–10° C. and it is then added to a mixture of ice and water. The 1-R-3-(2-pyridyl)-3-pyrrolidinol is isolated by acid-base extraction of the ether layer.

A mixture of one part of a 1-R-3-(2-pyridyl)-3-pyrrolidinol and 5–8 parts of polyphosphoric acid is heated at a temperature of from about 160° C. to about 190° C. for a period of from about 15 minutes to about 30 minutes. The cooled mixture is made basic and the base-insoluble 1-R-3-(2-pyridyl)-3-pyrroline is extracted using a suitable solvent.

Alternative methods of preparation for 1-R-3-(2-pyridyl)-3-pyrrolidinols include (a) hydrogenation of 1-benzylpyrrolidinium halides, (b) alkylation of 3-(2-pyridyl) - 3 - pyrrolidinols and (c) hydrolysis of 1-alkoxycarbonyl - 3 - (2 - pyridyl) - 3 - pyrrolidinols. The above methods are more fully illustrated in the examples which follow.

The pharmaceutically acceptable acid addition salts include those prepared from suitable organic and inorganic acids as, for example, those prepared from acids such as hydrochloric, sulfuric, sulfamic, tartaric, fumaric, hydrobromic, hydroiodic, glycolic, citric, maleic, phosphoric and the like.

The local anesthetic action as determined for infiltration anesthesia by intradermal administration in guinea pigs was carried out according to the following procedure which is basically that described by Bulbring, E. and Wajda, I., J. Pharmacol. Exp. Therap. 85: 78–84, 1945.

TEST PROCEDURE FOR INFILTRATION ANESTHESIA

Tests for infiltration anesthesia were conducted in albino guinea pigs of either sex with body weights of about 400 to 1100 grams. The animals were conscious and were restrained lightly in plastic stocks throughout the experiments. Hair was removed from the backs with electric clippers. Solutions of test compounds were injected intradermally using 6 to 8 sites per animal with each site approximately one cm. from the midline. The volume of injection was always 0.2 ml. Each site was marked with ink so as to facilitate location during the course of the experiment. Stimuli (pinch with homostat) were applied to each treated area in a series of six with time intervals among the six varied randomly. A series of stimuli was applied before treatment and at 5, 10, 15, 30 and 60 minutes after treatment. The number of responses at each time interval was recorded.

The following results are for the preferred compounds of the invention of Examples 1 and 7; namely, 1-benzyl-3-(2-pyridyl)-3-pyrrolidinol and 1-benzyl-3-(2-pyridyl)-3-pyrroline compared to lidocaine and procaine. Said preferred compounds have potent local anesthetic activity.

[Local anesthetic activity, intradermal administration to guinea pigs, percent reduction in responses to painful stimuli]

| Compound | Concentration, mg./ml. | No. of animals | Percent reduction in responses, minutes after injection— | | | |
|---|---|---|---|---|---|---|
| | | | 5 | 15 | 30 | 60 |
| Lidocaine | 30 | 35 | 97 | 92 | 70 | 24 |
| Do | 10 | 15 | 89 | 70 | 24 | 1 |
| Do | 3 | 7 | 86 | 45 | 0 | 0 |
| Procaine | 30 | 8 | 90 | 88 | 81 | 23 |
| Do | 10 | 7 | 98 | 72 | 19 | 0 |
| Do | 3 | 3 | 67 | 28 | 0 | 0 |
| Example 1 | 30 | 15 | 100 | 95 | 86 | 36 |
| Do | 10 | 6 | 97 | 86 | 67 | 17 |
| Do | 3 | 7 | 100 | 57 | 21 | 0 |
| Example 7 | 30 | 16 | 96 | 89 | 73 | 39 |
| Do | 10 | 6 | 67 | 59 | 44 | 14 |
| Do | 3 | 3 | 78 | 33 | 17 | 0 |

[Local anesthetic activity, intradermal administration to guinea pigs, results of statistical evaluation of concentration-effect data [a]]

| Compound | $LAC_{50}$ [b], mg./ml | 95% confidence limits, mg./ml. | Slope | Relative potency |
|---|---|---|---|---|
| Lidocaine | 4.0 | 2.4–5.7 | 4.36 | [c]100 |
| Procaine | 5.5 | 2.6–8.2 | 3.92 | 73 |
| Example 1 | 2.1 | 0.72–3.6 | 5.03 | 190 |
| Example 7 | 6.4 | 3.3–9.2 | 3.81 | 62 |

[a] Taken from Table 1, percent reduction in responses at the 15-minute interval.
[b] Local anesthetic concentration$_{50}$, the concentration that would be expected to block responses to 50% of the stimuli.
[c] Value for lidocaine assigned arbitrarily.

The compounds of this invention may be administered as the free bases or in the form of their pharmaceutically acceptable acid addition salts. They may be compounded and formulated into pharmaceutical preparations for topical and parenteral administration with organic or inorganic solid materials which are pharmaceutically acceptable carriers. The compositions may take the form of troches, ointments, solutions and the like. Such compositions are within the scope of the present invention.

The following examples are presented to illustrate the present invention and they should not be construed as limiting it in spirit or in scope.

Example 1

1 - benzyl - 3 - (2 - pyridyl) - 3 - pyrrolidinol dihydrochloride.—A solution of 17 g. (0.12 mole) of n-butylbromide in 35 ml. of dry ether was added dropwise to a stirred and cooled (−10° C.) suspension of 1.7 g. (0.25 mole) lithium wire in 100 ml. of ether. After the lithium dissolved, the mixture was cooled to between −40 and −60° C. while a solution of 17.5 g. (0.11 mole) of 2-bromopyridine in 20 ml. of ether was added. After addition the mixture was stirred 15 minutes at −40° C. and then treated with a solution of 17.5 g. (0.1 mole) of 1-benzyl-3-pyrrolidinone in 50 ml. of ether. The reaction mixture was allowed to warm to 10° C. and it was then poured into ice water. The ether layer was acid-base extracted and the ether extract of the base insoluble oil was dried over magnesium sulfate and then evaporated to an oil. The oil was dissolved in acetone and treated with ethereal hydrogen chloride, yielding a gum which on trituration with hot acetone gave 22.0 g. (68%) of the crystalline dihydrochloride which melted at 195–215° C. with decomposition. Recrystallization from isopropanol did not raise the melting point.

Analysis.—Calculated for $C_{16}H_{20}Cl_2N_2O$: (percent): C, 58.73; H, 6.16; N, 8.56. Found (percent): C, 58.45; H, 6.14; N, 8.43.

Example 2

1 - ethoxycarbonyl - 3 - (2-pyridyl)-3-pyrrolidinol hydrochloride.—A solution of 85 g. (0.6 mole) of n-butylbromide in 175 ml. of dry ether was added dropwise to a stirred suspension (−10° C.) of 8.5 g. (1.25 mole) lithium wire in 500 ml. of ether. After the lithium dissolved, the mixture was cooled between −40 and −60° C. and a solution of 87.5 g. (0.55 mole) of 2-bromopyridine in 100 ml. of ether was added. After addition, the mixture was stirred 15 minutes at −40° C. and then treated with 66 g. (0.2 mole) of 1-ethoxycarbonyl-3-pyrrolidinone in 250 ml. of ether. The mixture was allowed to warm to 10° C. and then it was poured into ice water. The ether layer was separated and the aqueous layer was extracted with chloroform. The combined organic layers were acid-base extracted and the base insoluble oil was extracted with chloroform. The dried (magnesium sulfate) solution was stripped to give 66 g. of oil. The crude oil was distilled to remove by-product material and the fraction which distilled at 158–164° C./0.2 mm. contained the desired material. An acetone solution of the oil was treated with hydrogen chloride gas and the hydrochloride salt was precipitated by the addition of dry ether. Trituration of the precipitate with ether gave a solid which was recrystallized from isopropanol-isopropyl ether and then from acetonitrile to give 11 g. (10%) of product which melted at 174–176° C.

Analysis.—Calculated for $C_{12}H_{17}N_2O_3Cl$ (percent): C, 52.84; H, 6.28; N, 10.27. Found (percent): C, 53.04; H, 6.33; N, 10.43.

Example 3

3-(2-pyridyl)-3-pyrrolidinol dihydrochloride.—A mixture of 23.6 g. (0.1 mole) of 1-ethoxycarbonyl-3-(2-pyridyl)-3-pyrrolidinol and 50 ml. of concentrated hydrochloride acid was refluxed for 72 hours. The reaction mixture was concentrated under reduced pressure to a semi-solid which crystallized when triturated with isopropanol. The crude product weighed 16 g. (67%) and melted at 188–195° C. The dihydrochloride salt was recrystallized from a methyl isobutyl ketone-methanol mixture and melted at 212–215° C.

Analysis.—Calculated for $C_9H_{14}N_2OCl_2$ (percent): C, 45.59; H, 5.95; N, 11.81. Found (percent): C, 45.34; H, 5.90; N, 11.73.

Example 4

1-methyl-3-(2 - pyridyl)-3-pyrrolidinol hydroiodide.— A solution of 1-benzyl-3-(2-pyridyl)-3-pyrrolidinol (isolated from 9.8 g. of the dihydrochloride) in 25 ml. of 95% ethanol was mixed with 4.26 g. (0.03 mole) of methyl iodide and the mixture was stirred overnight. The mixture was treated with 10% palladium-on-charcoal catalyst and shaken in three atmospheres of hydrogen at about 60° C. The cooled mixture was filtered and the filtrate was concentrated to an oil which solidified and was crystallized from acetone-ether. The hydroiodide salt weighed 3 g. (33%) and melted at 154–156° C.

*Analysis.*—Calculated for $C_{10}H_{15}INO$ (percent): C, 39.23; H, 4.94; N, 9.15. Found (percent): C, 39.23; H, 4.96; N, 8.85.

Example 5

When in the procedure of Examples 1, 2, and 4, 1-benzyl-3-pyrrolidinone is replaced by an equal molar amount of 1-phenethyl-3-pyrrolidinone,
1-ethyl-3-pyrrolidinone,
1-propyl-3-pyrrolidinone, and
1-methoxycarbonyl-3-pyrrolidinone, there are obtained:

1-phenethyl-3-(2-pyridyl)-3-pyrrolidinol,
1-ethyl-3-(2-pyridyl)-3-pyrrolidinol,
1-propyl-3-(2-pyridyl)-3-pyrrolidinol, and
1-methoxycarbonyl-3-(2-pyridyl)-3-pyrrolidinol.

Example 6

3-(2-pyridyl)-3-pyrroline hydrochloride.—A mixture of 8 g. (0.036 mole) of 3-(2-pyridyl)-3-pyrrolidinol and 50 ml. of polyphosphoric acid was stirred at 180° C. The mixture was heated until frothing ceased and it was then carefully neutralized with cold 50% sodium hydroxide solution. The product was extracted into chloroform which was dried over magnesium sulfate and concentrated to oil (4.5 g.). The crude oil was dissolved in isopropanol and the solution was treated with ethereal hydrogen chloride. The hydrochloride melted at 230° C. with decomposition; the yield was 3.5 g. (45%). The nuclear magnetic resonance spectrum supported the 3,4-pyrroline structure.

Example 7

1-benzyl-3-(2 - pyridyl)-3-pyrroline hydrochloride.—A mixture of 32.7 g. (0.1 mole) of 1-benzyl-3-(2-pyridyl)-3-pyrrolidinol and 200 ml. of concentrated hydrochloric acid containing 10 ml. of concentrated sulfuric acid was refluxed for eight hours. Thin layer chromatography showed no dehydration. The reaction mixture was concentrated under reduced pressure and the residue was dissolved in approximately 200 ml. of polyphosphoric acid. The mixture was successively heated for 15 minutes at 170° C., cooled and neutralized carefully with 50% sodium hydroxide solution. The product was extracted into benzene, dried over magnesium sulfate and concentrated to an oil. An ether solution of the oil was treated with ethereal hydrogen chloride. The hydrochloride was crystallized from hot isopropanol; yield 13.5 g. (50%). The salt melted at 207–210° C. with decomposition.

*Analysis.*—Calculated for $C_{16}H_{17}N_2OCl$ (percent): C, 70.45; H, 6.28; N, 10.27. Found (percent): C, 70.54; H, 6.31; N, 10.31.

Example 8

When in the procedure of Example 7, 1-benzyl-3-(2-pyridyl)-3-pyrrolidinol is replaced by an equal molar amount of 1-phenethyl-3-(2-pyridyl)-3-pyrrolidinol,
1-methyl-3-(2-pyridyl)-3-pyrrolidinol,
1-ethyl-3-(2-pyridyl)-3-pyrrolidinol, and
1-propyl-3-(2-pyridyl)-3-pyrrolidinol, there are obtained 1-phenethyl-3-(2-pyridyl)-3-pyrroline,
1-methyl-3-(2-pyridyl)-3-pyrroline,
1-ethyl-3-(2-pyridyl)-3-pyrroline, and
1-propyl-3-(2-pyridyl)-3-pyrroline,

What is claimed is:

1. A compound selected from those having the formula:

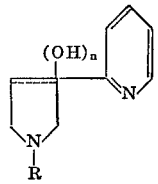

wherein;

R is selected from lower-alkyl, hydrogen, phenyllower-alkyl and lower-alkoxycarbonyl, n is one and zero and when n is zero, the dotted line is a double bond, or the pharmaceutically acceptable acid addition salts thereof.

2. A compound of claim 1 which is 1-benzyl-3-(2-pyridyl)-3-pyrrolidinol.

3. A compound of claim 1 which is 1-benzyl-3-(2-pyridyl)-3-pyrroline.

4. A compound of claim 1 which is 1-ethoxycarbonyl-3-(2-pyridyl)-3-pyrrolidinol.

5. A compound of claim 1 which is 1-methyl-3-(2-pyridyl)-3-pyrrolidinol.

6. A compound of claim 1 which is 3-(2-pyridyl)-3-pyrrolidinol.

7. A compound of claim 1 which is 3-(2-pyridyl)-3-pyrroline.

8. A compound of claim 1 which is 1-benzyl-3-(2-pyridyl)-3-pyrroline.

References Cited

Cavalla et al.: "Analgetics Based on the Pyrrolidine Ring," J. Med. Pharm. Chem., vol. 5, pp. 441–51 (1962).

Theilheimer, W.: "Synthetic Methods of Organic Chemistry," vol. 18, 1964, p. 354.

HENRY R. JILES, Primary Examiner

M. A. M. CROWDER, Assistant Examiner

U.S. Cl X.R.

260—295 K, 296 R; 424—26.3